United States Patent Office 3,149,715
Patented Sept. 22, 1964

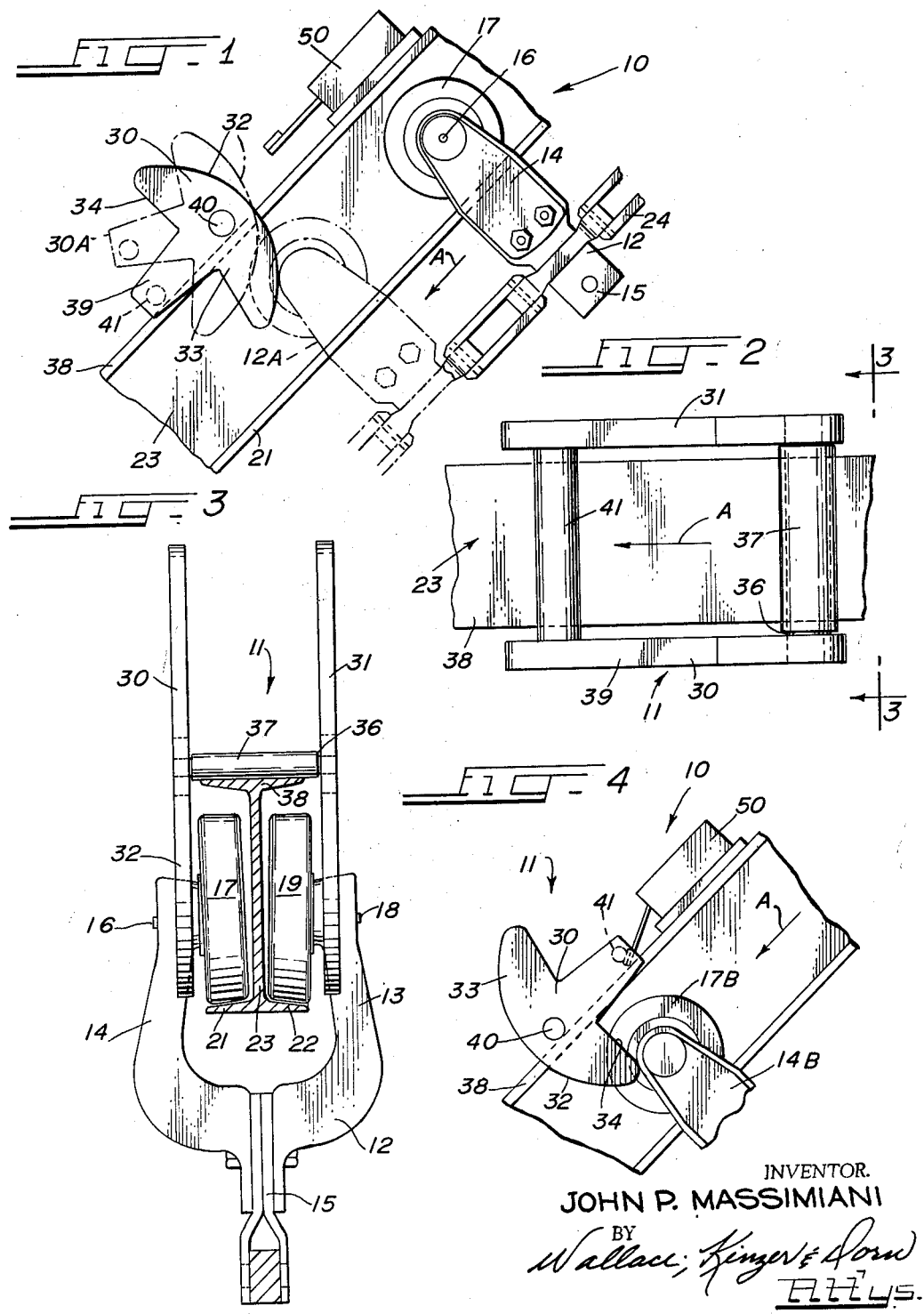

3,149,715
CONVEYOR SAFETY DEVICE
John P. Massimiani, 421 Ruby Ave.,
Clarendon Hills, Ill.
Filed Aug. 15, 1963, Ser. No. 302,317
4 Claims. (Cl. 198—232)

This invention relates to a new and improved conveyor safety device and more particularly to a mechanical safety device for use on a downhill run of a conveyor of the kind comprising a plurality of trolleys or the like that are connected to each other and move along a continuous path.

It is common practice to transport different materials, articles, and parts from one part of a manufacturing plant to another by means of conveyor apparatus. One frequently used conveyor system comprises a continuous fixed support rail, or parallel rails, along which a plurality of trolleys are moved. Usually, the trolleys are interconnected by a chain or other like means so that all of the trolleys can be driven from a single drive location. The spacing between the trolleys is maintained constant by the chain, so that all of the trolleys move at the same speed.

In the use of conveyor apparatus of this kind, substantial damage may be incurred if the chain breaks. This is particularly true where any substantial portion of the conveyor path is disposed at an angle to the horizontal; if the chain breaks, the conveyor apparatus may rapidly reach excessive speeds along the inclined run. Consequently, it is necessary to provide safety devices on both uphill and downhill runs of the conveyor to protect the same against accidents of this kind.

Previously known safety devices for uphill conveyor runs have generally been quite simple and inexpensive in construction. Usually, a safety device for an uphill conveyor run constitutes a pivotally mounted stop member that is lifted by engagement with each trolley moving along the uphill section of the conveyor. The movement of the member is kept within limits such that it always falls back to its initial position and does not interfere with movement of the trolleys in the intended direction. On the other hand, if the chain interconnecting the trolleys breaks and they start to move back down the uphill run, the safety member blocks such movement and, accordingly, minimizes damage to the conveyor and to the materials carried by the conveyor.

Safety devices for downhill conveyor runs, on the other hand, have been much more complex and expensive. Most devices of this kind constitute velocity-sensing members that are used to control electrically actuated or other power-actuated stop members for blocking movement of the conveyor trolleys. A few mechanical devices for use on downhill runs have been known, but these devices have also been substantially more complex than the safety devices used on uphill conveyor runs.

It is a principal object of the present invention, therefore, to afford a reliable mechanical safety device for a downhill run of a conveyor that is extremely simple and inexpensive in construction. In particular, it is an object of the invention to afford a reliable and effective safety device, for a downhill run of a conveyor, that is comparable in construction and operation to the successful yet quite inexpensive devices used on uphill runs.

A particular object of the invention is to provide a mechanical safety device for a conveyor, suitable for use on a downhill run, that does not depend upon springs, latches, or other similar apparatus, but is controlled solely by gravity and by engagement with the conveyor members moving past the safety device.

An additional object of the invention is to provide for long life and reliable operation, in a mechanical downhill safety device for an endless-chain conveyor, by reducing shock and abrasion from engagement of the safety device by the trolleys or other comparable conveyor members. A particular feature of the invention relating to this object is the use of a curved and preferably arcuate cam surface on the safety device at the point of engagement with the conveyor trolleys.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is an elevation view of a portion of an endless-chain conveyor, showing a safety device constructed in accordance with the present invention;

FIG. 2 is a plan view of the safety device shown in FIG. 1, drawn to a somewhat enlarged scale in comparison with FIG. 1;

FIG. 3 is a sectional view taken approximately along line 3—3 in FIG. 2; and

FIG. 4 is an elevation view, similar to FIG. 1, showing the safety device in a second or actuated position.

FIGS. 1–4 illustrate a conveyor 10 of conventional construction, together with a safety device 11 constructed in accordance with one embodiment of the present invention. Conveyor 10 comprises a plurality of trolleys or like support members 12. Each of the trolleys 12 comprises a yoke-like structure having two arms 13 and 14. At the lower end of each of the trolleys, the arms are joined together and connected to a hanger 15 from which the material being carried by the conveyor is suspended.

The upper end of arm 14 of trolley 12 carries a shaft 16 that projects inwardly of the yoke toward arm 13 (see FIG. 3). A trolley wheel 17 is journalled on this shaft. Similarly, arm 13 of the trolley carries a shaft 18 upon which a second trolley wheel 19 is rotatably mounted.

The individual trolley wheels 17 and 19 are supported upon the opposed flanges 21 and 22, respectively, of an I-beam 23. I-beam 23 comprises a continuous fixed support rail for the conveyor. As indicated by arrows A in FIGS. 1, 2 and 4, the normal direction of movement of the trolleys, such as trolley 12, along the illustrated section of I-beam 23, is in a downward direction. Thus, the illustrated portion of conveyor 10 constitutes a downhill run and the path of trolley movement along flanges 21 and 22 is a downward path.

Trolley 12 is connected to the preceding and succeeding trolleys of the conveyor by suitable connecting means that is normally effective to control the speed of the trolleys. On a downhill run, such as is illustrated in the drawings, a principal function of this connecting means is to prevent excessive acceleration of the conveyor trolleys; thus, in normal operation the connecting means maintains the speed of the trolleys below a safe maximum. In the construction illustrated in FIG. 1, the connecting means comprises a chain 24 that links all of the trolleys in the conveyor.

Safety device 11 comprises a pair of substantially T-shaped cam members 30 and 31 located on opposite sides of support rail 23. Cam member 30 has an arcuate exterior cam surface 32 along the outer edge of the cross arm 33 of the T. The inner edge of the cross arm 33 includes a stop surface 34 that is disposed at an abrupt angle relative to cam surface 32. In the illustrated construction, the two sides of the cross arm 33 of cam member 30 are essentially symmetrical so that two potential stop surfaces are provided at the opposed ends of the cross arm, but only surface 34 is utilized as a stop surface, as described more fully hereinafter.

Cam member 31 is located on the opposite side of support rail 23 from cam member 30 and is essentially identical in configuration to cam member 30.

Safety device 11 further includes mounting means for mounting both of cam members 30 and 31 on support rail 23. The mounting means, in the illustrated embodiment, comprises a shaft 36 that extends through and is journalled in a bearing member 37 mounted on the upper plate 38 of I-beam 23. Bearing member 37 may be welded or otherwise secured to the I-beam. The oppsite ends of shaft 36 may be secured to cam members 30 and 31 by suitable means; thus, the ends of the shaft may be threaded into the cam members, or may be swaged therein.

The mounting means comprising shaft 36 and bearing 37 supports cam members 30 and 31 for pivotal movement about a transverse axis 40 that is located above the path followed by trolleys 12 along support rail 23. Axis 40 is located eccentrically relative to cam surface 32; that is, cam surface 32 is a circular arc or other regular curved surface, and axis 40 is closer to the cam surface than the center of curvature thereof. Preferably, the pivotal axis for the cam members coincides approximately with the junction of the cross arm 33 and the leg 39 of the T-shaped cam member 30, and the same relation is maintained relative to the similar cam member 31.

Leg 39 of cam member 30 constitutes a counterweight for the cam member. A stop member 41 is affixed to cam member 30, near the end of leg 39. Stop member 41, accordingly, comprises a part of the counterweight for the cam member. In safety device 11, a single fixed shaft is used as a stop member for both of cam members 30 and 31; thus, stop member 41 extends completely across the safety device and joins the legs of the two cam members 30 and 31.

Safety device 11 is shown in FIGS. 1–3 in the first of two stable positions for the device, a second stable position being illustrated in FIG. 4. Referring to FIG. 1, it is seen that the trolley 12 moving along rail 23 in the direction indicated by arrow A comes into engagement with the lower portion of the arcuate cam surface 32 on cam member 30. It is the yoke arm 14 that engages cam surface 32, as shown by FIGS. 1 and 3. At approximately the same time, the yoke arm 13 on the opposite side of the trolley comes into engagement with the corresponding curved cam surface of cam member 31.

The continued downward movement of trolley 12 pivots cam members 30 and 31 clockwise from the position illustrated for member 30 in FIG. 1. The engagement between arm 14 and cam surface 32 is not primarily a sliding or scraping engagement. Instead, the cam surface engages the trolley in rolling contact, thereby substantially reducing wear on the cam surface in comparison with that which would occur if a true sliding contact were effected. It should be noted that the basic nature of the engagement would be in rolling contact even if cam surface 32 were to engage some other part of trolley 12 instead of the arm 14, since the arcuate cam surface 32 merely rolls along whatever part of the trolley engages it.

Due to the eccentric mounting of cam member 30, the clockwise movement of the cam produced by continued downward movement of trolley 12 progressively elevates cam surface 32 and moves the same toward an intermediate position illustrated by phantom outline 32A in FIG. 1. At this point, the trolley 12 is enabled to move past cam member 30, clearing the same as illustrated by outline 12A.

Position 30A for cam member 30 represents the approximate normal limit of pivotal movement of the cam member induced by the trolleys passing through safety device 11. Each time a trolley engages the safety device, moving at a normal safe speed, the cam member is pivoted to position 30A and the trolley clears the cam member and moves beyond it down rail 23. As soon as the trolley is clear of the safety device, the counterclockwise moment afforded by the counterweight, comprising leg 39 of the cam member and stop member 41, causes the cam member to pivot back to the original position as shown in solid lines in the drawing.

It will be recognized that the same effect takes place with respect to cam member 31, since the two cam members 30 and 31 are joined together by stop member 41 and are provided with a common pivotal mounting by shaft 36. Thus, it is seen that in normal operation safety device 11 does not interfere in any way with conveyor 10.

Effective operation of safety device 11, relative to conveyor 10, occurs if chain 24 is broken or otherwise released, permitting trolleys 12 to accelerate downwardly along rail 23. Thus, a trolley moving downwardly along the support rail at a relatively high speed imparts a substantially greater acceleration to cam member 30 than is realized in normal operation of the conveyor. When this happens, safety device 11 is driven beyond the intermediate position shown by phantom outline 30A in FIG. 1, to a point where the counterweight afforded by the legs of the T-shaped cam members and by stop member 41 is disposed to the right of axis 38 as viewed in FIGS. 1 and 4. When this happens, the moment afforded by the counterweight construction tends to rotate the safety device in a clockwise direction. Consequently, the clockwise rotation initiated by the trolley striking the safety device is continued until the cam members reach a second stable position illustrated by the position of cam member 30 in FIG. 4.

FIG. 4 illustrates operation of safety device 11 with respect to the next trolley moving along rail 23, following actuation of the safety device to its second or blocking position in response to movement of a trolley past the safety device at an excessive speed. This next trolley, as shown by arm 14B finds stop surface 34 of cam member 30 disposed in its path of movement. When arm 14B engages surface 34, it cannot continue its downward movement (arrow A). Stop member 41 prevents further clockwise movement of the safety device; hence, the trolley is blocked and cannot continue run-away movement.

From the foregoing description, it will be apparent that the critical point for pivotal movement of safety device 11 is that at which the counterweight stop member 41 is located directly above pivotal axis 40. As long as the safety device does not rotate beyond this point, it will return, by gravity, to the original position. As soon as excessive speed of the trolleys causes the safety device to pivot beyond this point, however, the moment of the counterweight is effective to continue the pivotal movement until the safety device reaches the position shown in FIG. 4 and interrupts operation of the conveyor.

It is usually desirable to shut off the conveyor power as soon as a break occurs. To this end, a limit switch 50 may be mounted on the rail 23 in position to be engaged by arm 39 as the device 11 moves from its normal position (FIG. 1) to its actuated position (FIG. 4). The switch may be connected in a control circuit for the drive apparatus of the conveyor, automatically cutting off the conveyor drive whenever device 11 is actuated.

Safety device 11 is extremely inexpensive in construction, due to its simplicity, but is quite reliable in operation. There are no latches or springs in the device to present potential maintenance difficulties. As long as the bearing comprising shaft 36 and bearing member 37 is kept in good working order, there is no basis for failure of the device. In normal usage, the cam surfaces of the device are engaged only in rolling contact by the trolley members, so that shock and abrasion damage due to repeated passage of the trolleys past the safety device is minimal.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A safety device for a conveyor comprising a plurality of trolleys or the like movable along a given downhill path adjacent fixed support structure, and connecting means normally effective to maintain the speed of the trolleys below a safe maximum, said safety device comprising:

a cam member having a curved exterior cam surface and a stop surface extending at an abrupt angle relative to said cam surface;

mounting means for mounting said cam member on said support structure for pivotal movement about a transverse axis above a given point on said path, said axis being eccentrically located relative to said cam surface;

and a counterweight stop member, affixed to said cam member and projecting outwardly of said axis away from said cam surface, for engaging said support structure at spaced points below and above said axis to define first and second stable positions for said cam member, and having sufficient moment to maintain said cam member in either position due to gravity alone, said cam surface projecting into said path to engage each trolley in rolling contact and deflect said cam member from said first position toward said second position, and said stop surface projecting into said path to block trolley movement when said cam member is in said second position, the moment of said counterweight stop member being sufficient to return said cam member to its first stable position without reaching said second position as long as said trolleys do not exceed said maximum speed at the time of engagement with said cam member.

2. A safety device for a conveyor comprising a plurality of trolleys or the like movable along a given downhill path along a fixed support rail and connecting means normally effective to maintain the speed of the trolleys below a safe maximum, said safety device comprising:

a substantially T-shaped cam member having an arcuate exterior cam surface along the outer edge of the cross-arm of the T and a stop surface along the inner edge thereof;

mounting means for mounting said cam member on said support rail for pivotal movement about a transverse axis above a given point on said path, said axis being at the junction of the cross-arm and the leg of the cam member in eccentric relation to said cam surface;

and a stop member, affixed to the leg of said cam member near its outer end relative to said axis, for engaging said support structure at spaced points below and above said axis to define first and second stable positions for said cam member, said stop member and the leg of said cam member together affording a counterweight having sufficient moment to maintain said cam member in either stable position due to gravity alone, said cam surface projecting into said path to engage each trolley in rolling contact and deflect said cam member from said first position toward said second position, and said stop surface projecting into said path to block trolley movement when said cam member is in said second position, the moment of said counterweight stop member being sufficient to return said cam member to its first stable position without attaining said second position as long as said trolleys do not exceed said maximum speed.

3. A safety device for a conveyor comprising a plurality of trolleys or the like each having a pair of wheels movable along a given downhill path along a fixed support structure, and connecting means between said trolleys normally effective to maintain the speed of the trolleys below a safe maximum, said safety device comprising:

a pair of cam members each having a curved exterior cam surface and a stop surface extending at an abrupt angle relative to said cam surface;

mounting means for mounting said cam members on said support structure for pivotal movement about a common transverse axis above a given point on said path, said axis being eccentrically located relative to said cam surfaces;

and a counterweight stop, comprising a stop member affixed to and connecting said cam members at a point displaced outwardly of said axis away from said cam surfaces, for engaging said support structure at spaced points below and above said axis to define first and second stable positions for pivotal movement of said cam members, and having sufficient moment to maintain said cam members in either position due to gravity alone, said cam surfaces projecting into said path to engage the wheels of each trolley in rolling contact and deflect said cam members from said first position toward said second position, and said stop surfaces projecting into said path to block trolley movement when said cam members are in said second position, the moment of said counterweight stop being sufficient to return said cam members to their first stable position as long as said trolleys do not exceed said maximum speed.

4. A safety device for a conveyor comprising a plurality of trolleys or the like movable along a given downhill path upon a fixed support rail and connecting means normally effective to maintain the speed of the trolleys below a given maximum, said safety device comprising:

a pair of cam members each having a substantially arcuate exterior cam surface and a stop surface extending at an abrupt angle relative to said cam surface;

mounting means for mounting said cam members in aligned position on opposite sides of said support structure for pivotal movement about a transverse axis above a given point on said path, said axis being located within the arc of each of said arcuate cam surfaces;

and a counterweight stop, affixed to said cam members and projecting outwardly of said axis away from said cam surface, for engaging said support structure at points located below and above said axis to maintain said cam members in either of first and second stable positions by gravity alone, said cam surfaces projecting into said path to engage each trolley in rolling contact when said cam members are in said first limiting position and said stop surface projecting into said path to block trolley movement when said cam members are in said second position, the moment of said counterweight stop member being sufficient to prevent rotation of said counterweight stop beyond a vertical plane through said axis and thus assuring return of said cam members to said first stable position as long as said trolleys do not exceed said maximum speed.

References Cited in the file of this patent

UNITED STATES PATENTS 1,806,913    Paquette  ---------------  May 26, 1931